United States Patent [19]

Kjellberg

[11] 3,926,261

[45] Dec. 16, 1975

[54] HARROW DEVICE

[75] Inventor: Jonas F. Kjellberg, Frielsberg, Sweden

[73] Assignee: SKF Industrial Trading and Development Company B.V., Jutphaas, Netherlands

[22] Filed: Nov. 14, 1974

[21] Appl. No.: 523,907

[30] Foreign Application Priority Data

Nov. 30, 1973  Sweden.............................. 7316192

[52] U.S. Cl. ................ 172/688; 172/703; 172/708; 172/701; 172/713; 172/732
[51] Int. Cl.² .................. A01B 23/02; A01B 23/04; A01B 19/02
[58] Field of Search ........... 172/713, 702, 703, 159, 172/160, 34, 704, 686, 701, 721, 732, 688, 172/708

[56] References Cited
UNITED STATES PATENTS

| 227,506 | 5/1880 | Eberly................................. 172/688 |
| 655,584 | 8/1900 | Schwartz........................ 172/688 X |
| 883,586 | 3/1908 | Swope.............................. 172/688 X |
| 1,893,416 | 1/1933 | Kaiser................................. 172/703 |

FOREIGN PATENTS OR APPLICATIONS 106,385  1/1939  Australia............................. 172/703

Primary Examiner—George J. Marlo
Attorney, Agent, or Firm—Howson and Howson

[57] ABSTRACT

Harrow tooth for spring harrows comprising an elongated generally trapezoidally shaped member having a central section of semicircular form and two leaf-shaped parts extending in opposite directions from said central section and being the mirror image of one another, the leaf-shaped parts being angularly offset to one side of a transverse plane through said central section so that they project forwardly in the running direction of the harrow, the side edges of each leaf-shaped part being twisted about its longitudinal axis and the outer transverse edge of each leaf-shaped part defining an angle of less than 90° with one of its side edges and an angle of greater than 90° with its other side edge.

6 Claims, 9 Drawing Figures

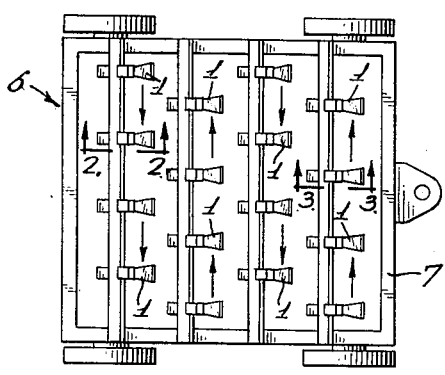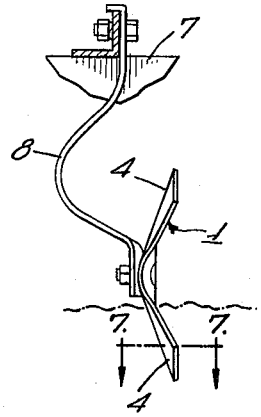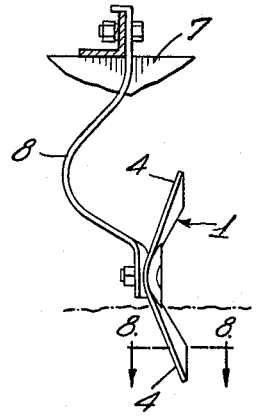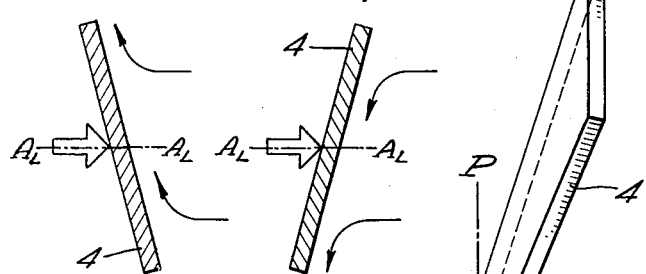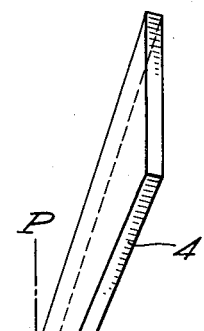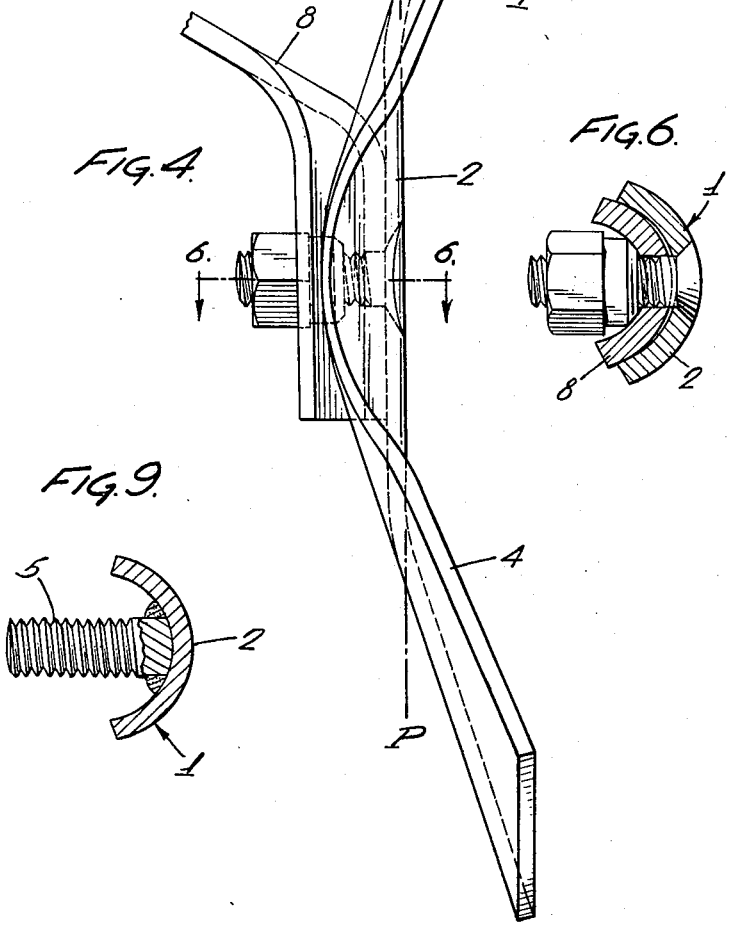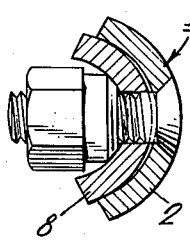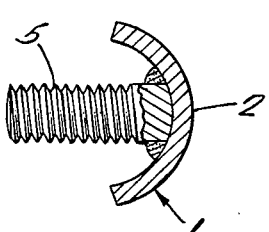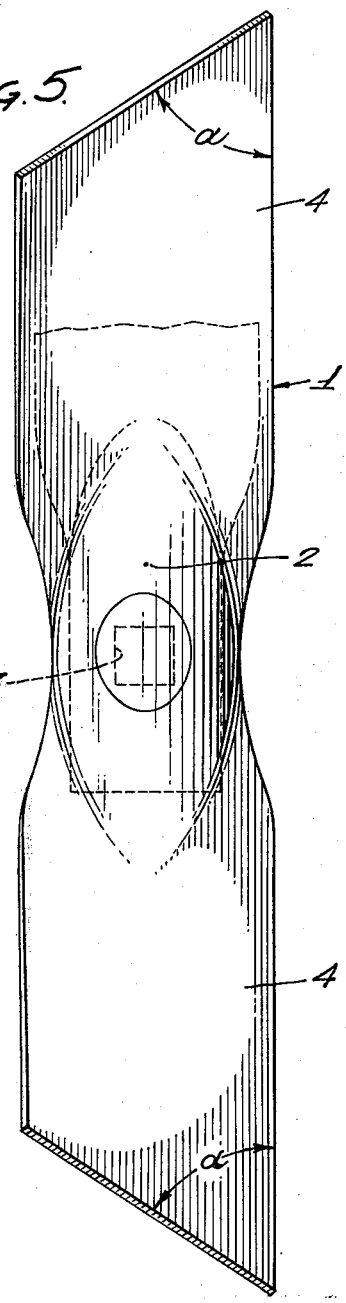

HARROW DEVICE

BACKGROUND OF THE INVENTION

The present invention relates to a soil treating pool for an agricultural machine such as a harrow tooth for spring harrows.

Different types of harrows are prior known, and still more tools for these harrows have been described earlier. For usual types of harrows so-called harrow teeth are used as soil treating tools. These are attached in a usual way at a spring arm and are pushed forward through the soil at a suitable depth.

The usual type of harrow teeth consists of a flat iron, bent along the center line and being bevelled at the ends and attached to the spring arm by means of a bolt or the like. Such a harrow tooth makes a straight furrow in the soil but has besides that no ploughing or breaking-up effect.

The object of the present invention has been to make a harrow tooth that, contrary to those prior known, both breaks up and to some extent turns the soil. It has to be cheap in production and, moreover, made of such a material, that it, by wearing out, fertilizes the soil with micro nutritive substances.

BRIEF SUMMARY OF THE INVENTION

According to the invention one has made a harrow tooth for spring harrows which has the features of having a middle part of a preferably semicircular section, from said middle part protruding in opposite directions leaf-shaped parts being each other's mirror picture, both being bent forward in the running direction of the harrow, having an outer transverse edge, which forms a non-right angle with the side edges of the leaves, and are somewhat twisted in relation to their longitudinal axis.

It is suitable to have an aperture in the middle part of the tooth for connection on to the spring arm.

Instead of an aperture the middle part may be equipped with a bolt or the like intended to be used as a fastening means.

BRIEF DESCRIPTION OF THE FIGURES

The invention will be described more in detail in the following in connection with the attached drawing, in which:

FIG. 1 is a plan view of a harrow incorporating harrow teeth constructed in accordance with the present invention;

FIGS. 2 and 3 are sectional views taken on lines 2—2 and 3—3 of FIG. 1;

FIG. 4 is a side elevational view showing the construction of the harrow tooth in accordance with the present invention;

FIG. 5 is a front view thereof;

FIG. 6 is a sectional view showing the connecting means taken on lines 6—6 of FIG. 4;

FIGS. 7 and 8 are sectional views of the leaf-shaped part of the tooth taken on lines 7—7 and 8—8 of FIGS. 2 and 3 respectively showing the attitude of teeth in adjacent rows of the harrow assembly; and FIG. 9 is a view partly in section of a modified form of fastening means.

DESCRIPTION OF SPECIFIC EMBODIMENT

The harrow tooth 1 has a middle part 2 which in the embodiment shown has been shaped with an approximately semicircular section. The middle part may be constructed with another sectional shape, but, what is important is that a good connection of the harrow edge to the spring arm of the harrow is obtained. It has namely been shown that conventional harrow teeth which have been made more or less plane, easily loosen from their spring arm, which means bad efficiency and quick wear of the tool. In the middle part an aperture 3 has been made in which a bolt is inserted for attaching to the spring arm of the harrow. From the middle part 2 the soil-treating leaf-shaped parts 4 protrude. These have both been bent forward in the running direction of the harrow tooth. As illustrated in FIG. 4, the leaf-shaped parts are angularly offset to one side of a transverse plane P through the central section at a predetermined angle. They are also somewhat twisted around their longitudinal axes AL. Besides this shape the transverse edge has been made in such a way, that the leaf-shaped parts make a mirror picture of each other, so that both ends of the harrow-edge may be used only by turning around the attaching point. The angle at which the leaf-shaped parts should be bent forward may vary according to the shape of the soil, but it is suitably in the order of 30° – 40°.

The twisting angle may also vary. It shall, however, not be too large and ought to be in the vicinity of 15°.

The longitudinal edge that shall be bent forward and, consequently run before the other longitudinal edge, is the shorter one of them. Thereby a ploughing effect is obtained.

The angle $\psi$ that the transverse edge shall have to the longitudinal edges may also vary but is suitably in the order of 40° – 50°.

Through its design the harrow edge will be deep-penetrating, i.e., it aims at penetrating down into the soil by itself at the same time as it gets a side-oriented force through its ploughing effect. If one, however, arranges every second row of harrow teeth so that they get side-oriented forces in different directions, these forces will balance each other and the harrow can be moved steadily forward without difficulty. A schematic showing of a harrow assembly with this arrangement of teeth generally designated by the numeral 6 is illustrated in FIGS. 1–3 inclusive and comprises a frame 7 having a plurality of depending spring support arms 8 which mount the teeth in lateral rows. FIGS. 7 and 8 illustrate the direction of movement of the soil in the adjacent rows of teeth to effect the plowing or breaking up effect.

In FIG. 9 another embodiment of the fastening means of the harrow tooth is shown, whereby a bolt 5 or the like is fixed, for instance, through welding, to the inner side of the middle part, serving as fastening means to the spring arm.

By making the harrow tooth of a suitable steel, which has been alloyed with such substances that are required for the plants, then the soil will be supplied with these substances when the teeth are worn down.

To get a satisfactory result when using conventional harrow teeth, it is necessary to harrow several times. Tests have shown that, when using harrow teeth according to the present invention, it is possible to reduce the number of times to the half and obtain the same breaking-up of the soil. A substantial saving of labour costs is thereby obtained.

The invention is not limited to the embodiment shown but can be varied in different ways within the scope of the claims.

I claim:

1. Harrow tooth for spring harrows comprising an elongated generally trapezoidally shaped member having a central section of semicircular form and two leaf-shaped parts extending in opposite directions from said central section and being the mirror image of one another, the leaf-shaped parts being angularly offset to one side of a transverse plane through said central section so that they project forwardly in the running direction of the harrow, the side edges of each leaf-shaped part being twisted about its longitudinal axis and the outer transverse edge of each leaf-shaped part defining an angle of less than 90° with one of its side edges and an angle of greater than 90° with its other side edge.

2. Harrow edge according to claim 1, characterized in that an aperture is provided in said central section for receiving the fastening means.

3. Harrow tooth according to claim 1, characterized in that said central section is equipped with a stud bolt to be used as fastening means.

4. A harrow tooth as claimed in claim 1 wherein the side edges of said leaf-shaped parts are twisted at an angle of about 15°.

5. A harrow tooth as claimed in claim 1 wherein said transverse edge is disposed at an angle of between 40° to 50° relative to one of the longitudinal side edges.

6. An assembly comprising a plurality of harrow teeth as claimed in claim 4 arranged in rows wherein every second row is oriented in a predetermined manner to balance the side oriented forces acting on the teeth during operation.

* * * * *